July 25, 1933.  W. C. LAUGHLIN ET AL  1,919,565
MEANS FOR CLEANING SEWAGE FILTER BEDS
Filed July 28, 1931  3 Sheets-Sheet 1

INVENTORS
William C. Laughlin
Abraham B. Asch
BY
their ATTORNEY

July 25, 1933.     W. C. LAUGHLIN ET AL     1,919,565
MEANS FOR CLEANING SEWAGE FILTER BEDS
Filed July 28, 1931     3 Sheets-Sheet 2

INVENTORS
William C. Laughlin
Abraham B. Asch
BY
their ATTORNEY

July 25, 1933. W. C. LAUGHLIN ET AL 1,919,565
MEANS FOR CLEANING SEWAGE FILTER BEDS
Filed July 28, 1931   3 Sheets-Sheet 3

INVENTORS
William C. Laughlin
Abraham B. Asch
BY C. P. Goepel
their ATTORNEY

Patented July 25, 1933

1,919,565

UNITED STATES PATENT OFFICE

WILLIAM C. LAUGHLIN, OF KEW GARDENS, AND ABRAHAM B. ASCH, OF BROOKLYN, NEW YORK, ASSIGNORS TO FILTRATION EQUIPMENT CORPORATION, OF NEW YORK, N. Y., A CORPORATION OF DELAWARE

MEANS FOR CLEANING SEWAGE FILTER BEDS

Application filed July 28, 1931. Serial No. 553,528.

Our present invention relates to sewage clarification tanks, more particularly to tanks of the character which are furnished with filter beds for filtering out impurities; and the invention has for its purpose and object to provide an improved clarification tank embodying improved means for cleaning the filter beds therein without interfering either with the filtering operations or with the processes of sewage treatment, transpiring within the tank.

An object of the invention is to provide, in a sewage clarification tank, a novel filter bed cleaning system and arrangement whereby the solids and impurities entrapped and enmeshed in the filter bed, will be separated from the effluent liquid that is practically free of solids and impurities. A further object is to collect the separated solids and impurities and to draw the same out of the tank for re-circulation or for such other disposition as may be desired, while permitting the clarified effluent to rise to its discharge outlet by reason of its natural movement towards its liquid level.

For the attainment of its objects, the invention in its evolvement has in view the provision of a water-head for receiving the inflowing sewage liquid or material and the level of this water-head is at an elevation above the discharge outlet for the clarified effluent. Over the filter bed is arranged a traveling filter bed cleaning device having a collector chamber; and the filter bed and cleaning device are so relatively positioned that the inlet to the collector chamber is below the level of the discharge outlet, so that by reason of the elevation of the water-head, the liquid in the immediate territory of the cleaning device will be forced over the inlet into the collector chamber, whereas the liquid outside of the territory of the cleaning device will flow to the elevation necessary to pass through the discharge outlets. According to a feature of the arrangement, the inlet to the collector chamber is restricted; and it is made adjustable as to height so that the level of this inlet may be varied with respect to the level of the water-head. By virtue of this provision, the pressure and velocity of the liquid upwardly through the filter bed in the territory of the cleaning device may be controlled.

More particularly, the present invention has for an object the provision of a filter bed which includes as the filtering medium a mass of sand or similar filtering material. It also has for an object to provide the cleaning device with rows of projections for raking through the mass of sand so that the dirt enmeshed therein will be released and given up into the pressural tide of sewage liquid which moves upwardly through the collector chamber inlet and thence into the collector chamber itself.

The arrangement also includes the provision of a discharge pump for pumping the dirty liquid and impure substances from the collector chamber as rapidly as they accumulate therein.

The raking projections of the present invention have been designed as terminal pipes or nozzles with a special view of ejecting fluid as water and air into the filtering mass, thereby further agitating the sand of the mass and additionally churning up the same for the release of the dirt enmeshed therein. In the present embodiment, the raking terminal pipes are illustrated as connected up with the pump discharge line, so that dirty liquid from the collector chamber may itself be utilized as the means for additionally agitating the sand.

It is within the province of the invention to provide a clarification tank which may have two filter beds of sand or the like, and, in correspondence therewith, two cleaning devices with raking projections for operating on the sand; and further to provide an overhead carriage or trolley which carries the two cleaning devices together with the pumps and discharge lines for discharging the dirty liquids from the cleaning devices. The carriage is equipped with wheels which turn on guide track rails positioned along the top of the tank; and it may be equipped with a power unit whereby to be self-propelled on the track rails.

By means of the carriage or trolley, the cleaning devices are moved continuously along the filter beds so that the sand composing the beds is not permitted to become sufficiently dirty to obstruct filtration. By reason of the water-head, the cleaning operation may be carried out by hydraulic means in conjunction with the raking means.

In the accompanying drawings, we have shown our invention, by way of example, as associated with a clarification tank and with a traveling carriage, having respectively the general construction and arrangement illustrated and described in more detail in our companion application for Letters Patent of the United States, filed August 4, 1931, Serial No. 555,054. The present invention is illustrated and described in brief as an alternative example in said companion application, but certain novel features of the invention herein claimed are not claimed therein.

With these and other objects in view, the invention consists in the construction and relative arrangement of parts so combined as to coact and cooperate with each other in the performance of the functions and the accomplishment of the results herein contemplated, and comprises in one of its adaptations the species or preferred form illustrated in the accompanying drawings in which:—

Figure 1:
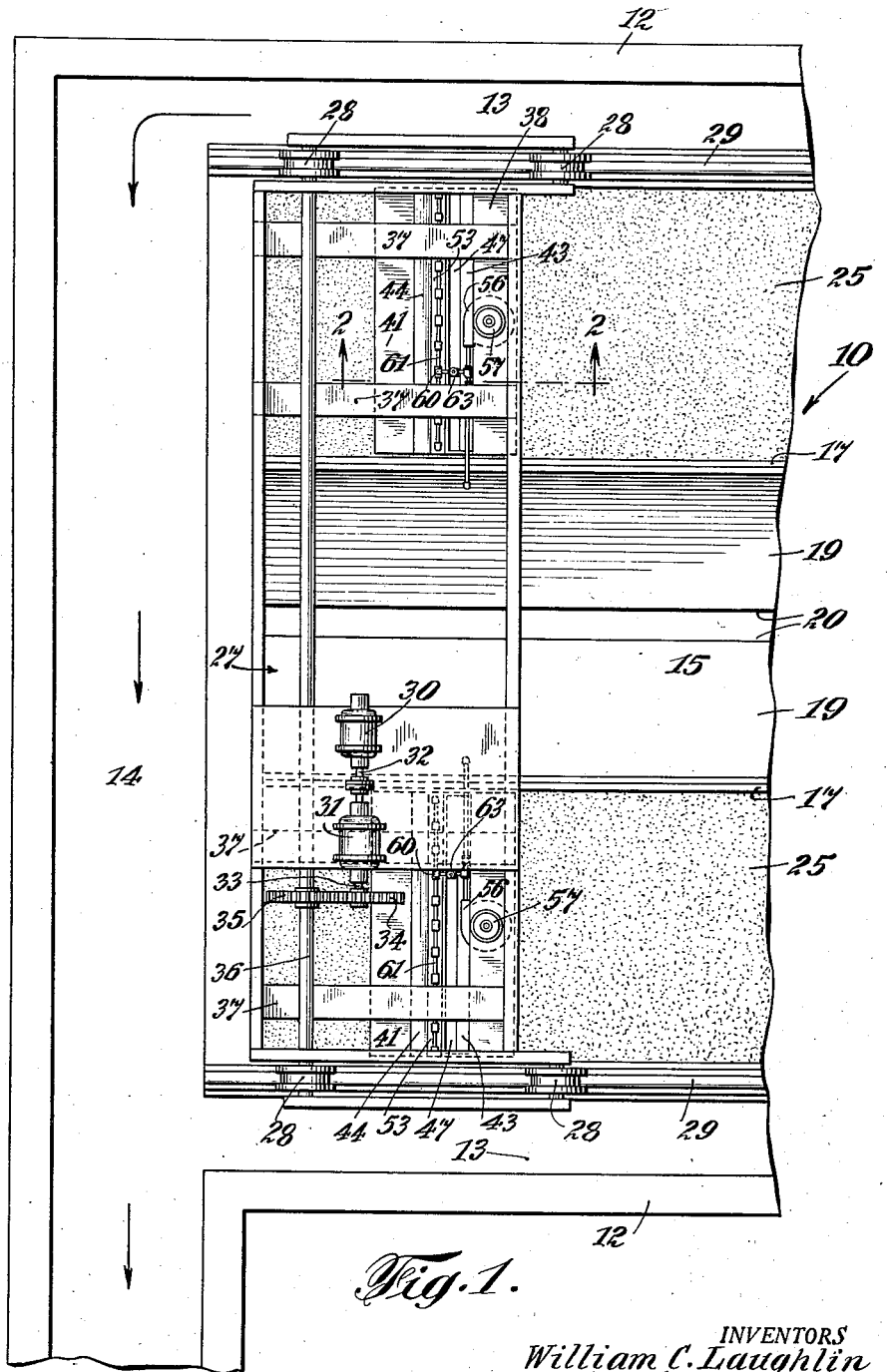
Figure 1 represents a top plan view, showing an end portion of a clarification tank provided with two sand beds and a water-head, and showing also the traveling carriage and cleaning devices carried thereby for operating upon the sand beds.
Figure 2:
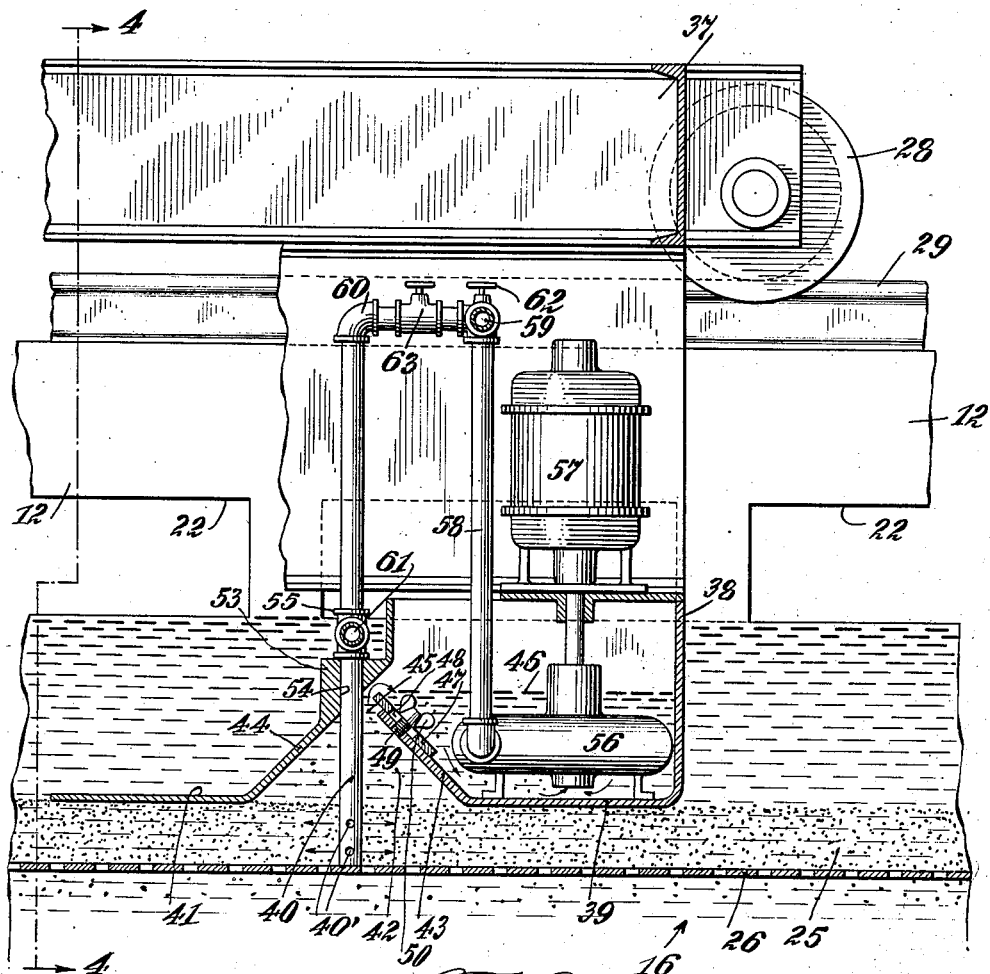
Fig. 2 represents a vertical sectional detail view of one of the sand bed cleaning devices constructed in accordance with our invention, this view being taken on the line 2—2 of Fig. 1.
Figure 5:
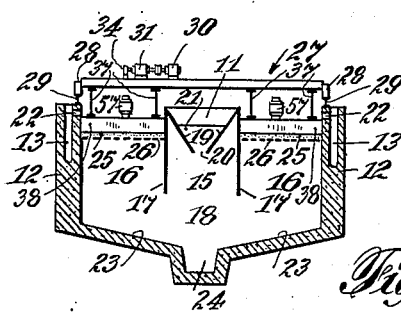
Fig. 5 is a diagrammatic illustration transversely of the clarification tank, showing the arrangement of the water-head for causing the sewage liquid to move upwardly through the two filter beds to the effluent discharge outlets.
Figure 3:
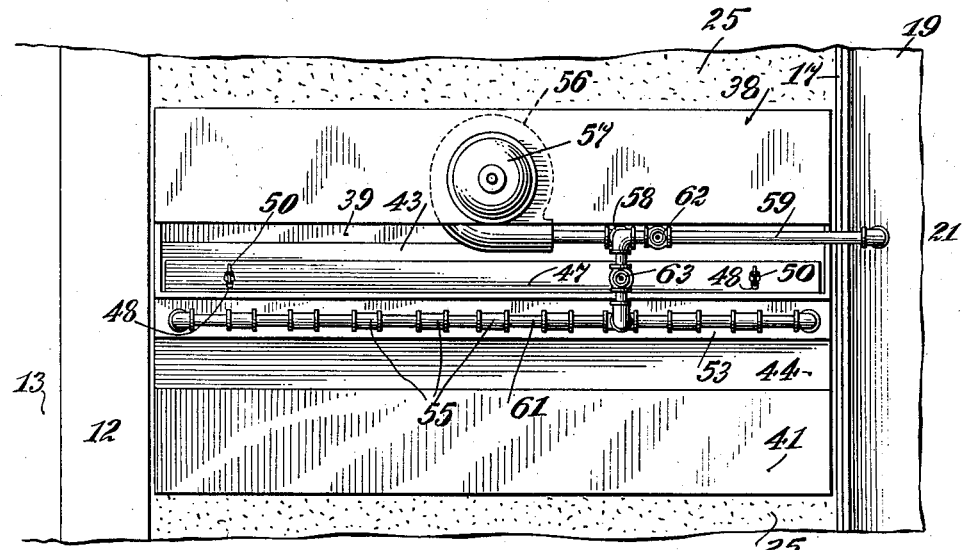
Fig. 3 is a top plan view of one of the sand bed cleaning devices.
Figure 4:
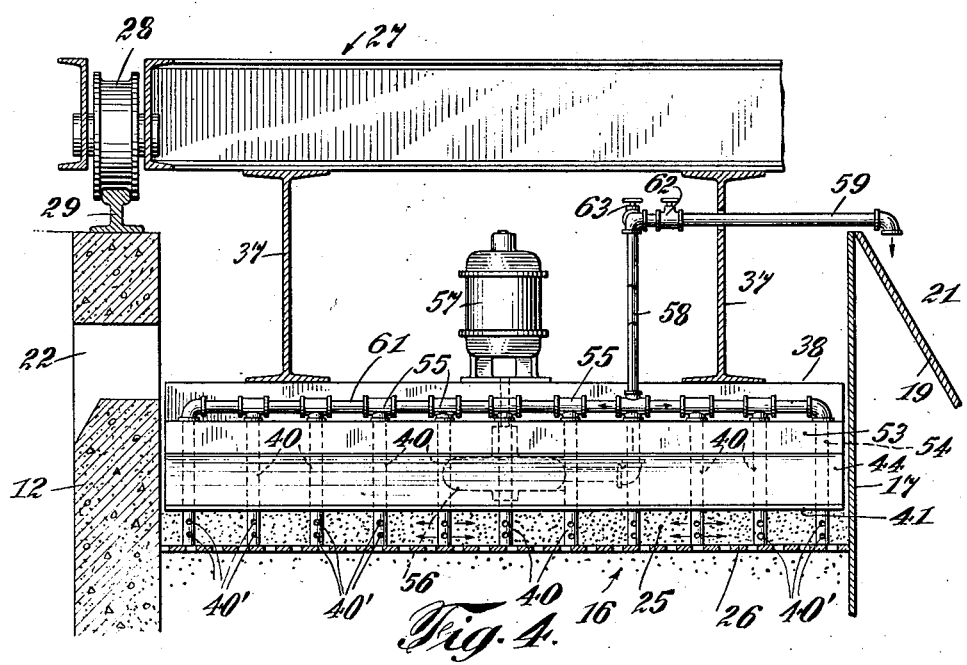
Fig. 4 represents an end view thereof, taken on the line 4—4 of Fig. 2.

Referring now in detail to the accompanying drawings, the sewage clarification tank is denoted in general by the reference numeral 10, and this tank in practice may consist of an elongated structure built from concrete or any material that may be suitable or approved for the purpose. One end of the tank is provided with an inlet 11 (Fig. 5) for the inflow of the sewage liquid. The opposite longitudinal side walls 12, 12 of the tank are each provided with a launder or trough 13 for carrying away the effluent. These launders or troughs empty into a main conduit 14 by which the effluent is conveyed away for disposition in any manner desired.

The interior of the tank is divided into a central chamber 15 and side chambers 16 by baffles 17, located in the upper portion of the tank and which terminate at their lower ends intermediate the height of the tank so as to provide in the bottom portion of the tank an open chamber 18 with which the central chamber 15 and each of the side chambers 16 are in communication. The upper portion of the chamber 15 is divided off by downwardly extending baffles 19 which converge as they extend downwardly in order to provide a restricted bottom feed opening 20. The inlet 11 is in direct communication with the chamber 21 between the baffles 19, and the sewage fluid which fills the chamber 21 constitutes a water-head the level of which is elevated above the spaced outlets 22 provided in the longitudinal sides 12 of the tank for the discharge of the effluent into the launders 13. By reason of the provision of the water-head, a siphoning action is provided for moving the liquid upwardly through the side chambers 16 for discharge through the outlets 22. The central chamber 15, two side chambers 16, 16 and water-head chamber 21, all extend lengthwise of the tank, with the central chamber 15 and water-head 21 occupying positions between the side chambers 16, 16.

The character of the sewage liquid which enters through the inlet 11 and fills the tank including the water-head 21, central chamber 15, bottom chamber 18 and side chambers 16, 16 need not be treated of herein. Also the details of the processes whereby the sewage solids, whether colloidal or suspended, are first converted into a slime-like strata of cellulose and sewage solids, and then when in such state are subjected to coagulation so that the imbibed water will be given up, need not be explained herein. These matters are explained at length in the companion application above referred to. It is sufficient to state here that the coagulated colloids including the solids of the sewage, which have a higher specific gravity than the water, settle downwardly to the bottom of the tank, while the lighter water, solids, and impurities rise in the side chambers under pressure to the discharge outlets 22. The relatively heavy matter or sludge settles onto the sloping bottom portions 23 of the tank and gradually moves to the channel 24 from where it is drawn off by a sludge pipe (not shown) or other suitable discharging medium.

In the upper portion of each of the side chambers 16 and below the plane of the discharge outlets 22, is provided a filter bed. The water and impurities rising in the side chambers 16 by reason of the pressure head, pass upwardly through the filter beds where the filtering out of the impurities takes place, and the clear water effluent resulting from the filtering action rises upwardly for its discharge through the outlets 22. The filter beds consist of a mass of sand 25 or similar material, and these beds are supported upon suitable filter screens 26 which extend the entire length of the chambers 16 between the baffles 17 and longitudinal side walls 12.

The apparatus for cleaning the filter beds includes a traveling carriage which is designated in general by the numeral 27, and which may consist of any suitable framework capable of carrying the various parts which make up the complete operative device for cleaning the sand beds. At its opposite ends the carriage is provided with a pair of wheels 28 which turn on track rails 29 provided upon the longitudinal sides 12 and inwardly of the positions of the effluent launders 13. These track rails provide for the movement of the carriage for the full length of the filter beds so that the sand can be cleaned throughout the length of the beds. By preference the carriage is furnished with its own power means, herein shown to consist of an electric motor 30 which is mounted upon the framework and in association with the motor, a reduction gear box 31 whereby, from the motor shaft 32, to operate the driving shaft 33 at reduced speed. The driving shaft carries a gear 34 which is in driving engagement with a gear 35 mounted upon a shaft or axle 36. At each end of the carriage, one of the two track wheels is mounted on the shaft or axle 36. Two cleaning devices are provided, one for each of the filter beds. These cleaning devices are suspended from the carriage by means of suitable I-beams 37. Inasmuch as the two cleaning devices are duplicates, a detail description of one of them will suffice for the other.

Each cleaning device includes a cleaner or cleaning tank 38 of a size to fit, transversely of the bed, between the baffle 17 and side wall 12, the fit in this regard being such that while the opposing sides of the cleaner come in close adjacency to said respective parts, yet they do not contact with said parts so as to provide frictional resistance. The bottom 39 of the cleaner, in the direction of the length of the sand bed is such as will define a definite territory or area of resistance for the agitation of the sand, accomplished in part by the pressure and velocity of the liquid rising upwardly through the sand and in part by raking projections 40. In the present instance, the dimension of the cleaner, lengthwise of the bed, is increased by the provision of an apron or plate 41 which is in alignment with the bottom 39. The device, between the bottom 39 and apron 41, for the full dimension of the device between the baffle 17 and side wall 12, is provided with a neck or inlet opening 42 formed between the baffles 43 and 44 which slope towards each other as they proceed upwardly so that the inlet will be relatively wide at the bottom where it is in open communication with the sand bed. The upwardly converging baffles form at the top of the inlet 42 a restricted feed opening 45 through which the water passes from the inlet 42 into the interior collector chamber 46 of the cleaner. Passage of the liquid through the feed opening 45 is controlled by a weir 47 which is connected with the baffle 43 for relative adjustment, upwardly and downwardly, the particular connection indicated in the present instance for this purpose consisting in the provision of suitable elongated slots 48 through which are passed threaded bolts 49 provided with wing nuts 50. The upwardly extending inlet to the collector chamber is thus located between the tank and the apron extension which parts together constitute the area or territory of resistance over the sand, wherein the dirty water and impurities will tend under pressure to rise through the upwardly extending inlet and pass over the weir into the interior chamber 46.

Under the foregoing construction, it will be apparent that by reason of the elevation of the water-head, any adjustment of the weir 47 in an upward or downward direction will influence the pressure and velocity of the liquid upwardly through the filter bed for the area covered by the bottom 39 and apron 41. The weir, therefore, may be adjusted in the precise position which will cause the sand between the screen 26 at the bottom of the bed and the bottom 39 and apron 41 at the top of the bed, to be kept in an agitated condition, undulating upwardly and downwardly, by the tide of liquid moving upwardly under pressure to the inlet 42.

The projections 40 provide mechanical means for raking through the sand bed and therefore stirring up the sand immediately below the inlet 42. In the present embodiment, the projections 40 consist of terminal pipes or nozzles, arranged in a row in the direction of the length of the inlet 42, that is to say, in a row transversely of the width of the sand bed. For the support of the terminal pipes, the baffle 44 is represented as provided at its upper portion with an enlargement 53 having apertures 54 for receiving the pipes. T-joints 55 provided on the tops of the pipes rest upon the enlargement 53. Arranged in this way, the pipes extend downwardly through the inlet 42 and into the sand bed. The lower ends of the pipes are close to the screen 26, so that the sand will be stirred up close to the screen. As the tank moves along the bed, the depending pipes rake through the sand, loosening and stirring it up, so that the dirt and impurities enmeshed in the sand are released or given up into the stream moving from the resistance area into the inlet 42. The terminal pipes are closed at their lower ends, but within the sand bed they are provided with lateral openings 40' for the ejection of liquid or substances under pressure into the interior of the sand bed. In this way by ejecting jets of liquid or substance, the sand may be additionally and thoroughly churned up from within the bed for the release of dirt. In the present instance, the terminal pipes are stationary; but they may, if desired, be mounted for movement, and means may be provided for moving them up and down or even in a sidewise direction as the cleaning device is moved along the sand bed.

Outside the territory occupied by the cleaner and its apron, the water which rises from the filter bed where the sand has not been agitated, is clear and rises under the siphoning action to the discharge outlets 22. The cleaner, it will be observed, shuts out the clear water, so that only the dirty water and impurities released through the agitation of the sand, will enter the chamber 46. The dirty water is removed from the chamber 46 by means of a centrifugal pump 56 operated by an electric motor 57, located upon the top of the tank where it is above the level of the flow of clear water through the discharge openings 22. The dirty water and impurities pumped out by the pump may be disposed of in any suitable manner. In the present instance, we show a discharge pipe line 58 connected with the pump and leading to a branch 59 for discharging the dirty water and impurities into the water-head 21 for re-circulation through the clarification tank.

One part 60 of the discharge pipe line may be connected with a horizontal distributing manifold 61 which carries the T-joints 55 for the terminal pipes 40. Under this arrangement, the dirty water pumped from the collector chamber may itself be used as the medium for churning up the sand from the interior of the bed. Suitable valves 62 and 63, furnished respectively on the lines 59 and 60, make provision for discharging all of the dirty water either into the water-head or into the terminal pipes, or if desired, part of the dirty water into the water-head and part of it into the terminal pipes. If desired, a pipe (not shown) for clean water or other liquid may be connected with the manifold, so that clean water may be ejected into the sand bed instead of the dirty water from the collector chamber.

The carriage or trolley, carrying the two cleaning devices, moves forwardly and backwardly along the elongated tanks so as to intervally clean all portions of the two sand beds from one end thereof to the other. The carriage is kept in continuous movement and the object is to clean all portions of the beds so frequently that there will be no opportunity for the sand to become very dirty. The cleaner the beds are kept, the cleaner the effluent will be. Owing to the provision of the water-head, which induces a flow of the liquid into the dirty water chamber of each of the cleaning tanks and as well through the higher discharge outlets 22, and the fact that each cleaning tank shuts out the clear water effluent while defining a territory of resistance or agitation wherein the dirty water and impurities within the bed are released for movement with the stream into the dirty water chamber, there results a constant separation of the impurities from the bed so that in practice the latter is practically free of solids and impurites. That part of the dirty water which is returned to the water-head is put into re-circulation for retreatment within the clarification tank, and that part which is ejected into the sand bed serves as means for churning up the sand.

It is understood that, in practice, the cleaning devices of our invention may be made for use in connection with circular clarification tanks, or square clarification tanks, as well as for elongated tanks of the type herein particularly referred to.

While our invention has been illustrated and described with some degree of particularity, it is realized that in practice various changes and alterations may be made therein, and further that the invention is capable of embodiment in many different tank constructions. It has been sought herein to illustrate only such an embodiment as will suffice to exhibit the character of the invention. Reservation is, therefore, made to the right and privilege of changing the form of the details of construction or otherwise altering the arrangement of the parts without departing from the spirit or scope of the invention or the scope of the appended claims.

We claim:

1. In combination, a movable tank provided with a liquid-receiving chamber, an inlet leading upwarly to the chamber for passage of liquid upwardly thereto from the exterior bottom of the tank, said inlet including a wall over which liquid escapes to fall into the chamber pipes projecting from the tank and having portions positioned for raking through the material below the inlet and provided with orifices for jetting liquid into the raked materal to release dirt therein into the liquid destined to pass upwardly through the inlet and thence over the wall into the chamber, and means carried by the tank for forcing liquid under pressure through said pipes.

2. Filter bed cleaning means comprising, with a filter bed of sand or the like, and means for maintaining a pressural movement of the liquid upwardly through and to a level above the sand a tank mounted for movement parallel with the surface of the sand, an inlet leading upwardly to the interior chamber of the tank for the passage thereto of liquid from the sand including a weir for spilling liquid into the chamber at a point below the maintained liquid level above the sand, means on the tank for raking the sand in the vicinity of the inlet, means for ejecting liquid into the raked sand immediately below the inlet for washing the dirt from the sand into the liquid destined to pass over the weir into the chamber, and means for withdrawing the liquid from the chamber.

3. Filter bed cleaning means comprising, with a filter bed of sand or the like, and means for maintaining a pressural movement of liquid upwardly through and to a level above the sand, a tank mounted to travel parallel with the surface of the sand, an inlet leading upwardly to the interior of the tank for the passage thereto of liquid from the sand, including a weir for spilling liquid into the interior of the tank at a point below the liquid level above the sand, a pump for withdrawing liquid from the chamber, a pump line for receiving the withdrawn liquid under pressure from the pump, and a series of pipes connected with the pump line and extending into the sand in the vicinity of the inlet, said pipes having discharge openings for ejecting liquid into the sand to thereby agitate the sand and release the dirt therein into the liquid destined to pass over the weir into said chamber.

4. Means for cleaning a bed of filtering material, the same comprising means for maintaining a pressural movement of liquid upwardly through and to a level above the material, a device mounted to travel in the liquid parallel with the surface of the bed and adapted to define over the material a resistance area to the upward movement of the liquid, a liquid receiving chamber in the device and an upwardly extending inlet leading thereto including a wall over which liquid that rises under pressural movement from the resistance area will escape to fall into the chamber, and means carried by said device for ejecting substance into the material within the resistance area, to agitate the material and thereby release the dirt therein for passage with the rising liquid up through the inlet and into said chamber, said means being carried by the device and extending into the material below said inlet.

5. Means for cleaning a bed of filtering material, the same comprising means for maintaining a pressural movement of liquid upwardly through and to a level above the material, a device mounted to travel in the liquid parallel with the surface of the bed and adapted to define over the material a resistance area to the upward movement of the liquid, a liquid receiving chamber in the device and an upwardly extending inlet leading thereto including a wall over which liquid that rises under pressural movement from the resistance area will escape to fall into the chamber, mechanical means on said device for raking through and washing the material in the resistance area on movement of the device, comprising tubes having liquid jetting and raking portions extending into the material below said inlet, and means carried by the device for forcing washing liquid under pressure through said tubes.

6. In a filter bed system including a sand bed, the combination of means for maintaining a pressural movement of liquid upwardly through and to a level above the surface of the sand, a tank traveling parallel with the surface of the sand and having a liquid receiving chamber above its bottom, an inlet to the chamber extending upwardly from the exterior bottom of the tank and having a wall over which liquid escapes to fall into the chamber at a point below the maintained liquid level above the surface of the sand, and means carried by the tank for washing the sand, said means being effective below said inlet to release dirt into the liquid destined to rise into the inlet for collection in said chamber.

7. In a filter bed system, the combination with a filter bed, of a tank traveling parallel with the surface of the bed and having a liquid receiving chamber above its bottom, an inlet to the chamber extending upwardly from the exterior bottom of the tank and having a wall over which liquid can flow to fall into the chamber, means for causing a tide of liquid which is to be filtered to move upwardly through said bed and to a level substantially above the flow over said wall, and means carried by the tank for agitating and washing the sand below the bottom of the tank, said means being effective below said inlet.

8. In a filter bed system, the combination with a tank adapted to be moved parallel with the surface of a sand bed, of an inlet channel intermediate the length of the tank extending upwardly from the bottom thereof for directing liquid rising upwardly from the bed into the interior of the tank, a weir adjustably associated with the channel and over which rising liquid will flow to fall into the interior of the tank, and means carried by the tank for washing the sand bed below said inlet channel.

WILLIAM C. LAUGHLIN.
ABRAHAM B. ASCH.